United States Patent
Ratte et al.

(10) Patent No.: US 9,479,027 B2
(45) Date of Patent: Oct. 25, 2016

(54) DRIVE UNIT FOR A MOTOR VEHICLE WITH AN ELECTRIC MACHINE AND A CLUTCH

(71) Applicants: Andreas Ratte, Dittelbrunn (DE); Gerald Viernekes, Hassfurt (DE); Alexander Markow, Schweinfurt (DE)

(72) Inventors: Andreas Ratte, Dittelbrunn (DE); Gerald Viernekes, Hassfurt (DE); Alexander Markow, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 422 days.

(21) Appl. No.: 14/028,598

(22) Filed: Sep. 17, 2013

(65) Prior Publication Data
US 2014/0077641 A1    Mar. 20, 2014

(30) Foreign Application Priority Data
Sep. 18, 2012    (DE) .......................... 10 2012 216 601

(51) Int. Cl.
| | |
|---|---|
| *H02K 7/108* | (2006.01) |
| *H02K 7/116* | (2006.01) |
| *F16D 28/00* | (2006.01) |
| *F16D 23/14* | (2006.01) |

(Continued)

(52) U.S. Cl.
CPC .............. *H02K 7/108* (2013.01); *B60K 6/387* (2013.01); *F16D 23/14* (2013.01); *F16D 28/00* (2013.01); *H02K 7/116* (2013.01); *B60K 2006/4825* (2013.01); *F16D 2023/123* (2013.01); *Y02T 10/6252* (2013.01)

(58) Field of Classification Search
CPC .......... H02K 7/108; H02K 7/10; H02K 7/11; H02K 7/112; H02K 7/1125; H02K 7/114; H02K 7/116; H02K 7/1166; H02K 17/32; H02K 23/68; H02K 27/30; H02K 49/00; B60K 6/387; B60K 2006/4825; F16D 27/00; F16D 27/04; F16D 27/09; F16D 28/00; F16D 13/50; F16D 13/755; F16D 2121/24; F16D 2121/26; F16D 2023/123; F16D 23/14; Y02T 10/6252
USPC ................... 310/78, 76, 92, 100, 99, 102 A; 192/48.2, 84.6, 84.8, 94, 90, 84.7, 192/111.14
See application file for complete search history.

(56) References Cited

U.S. PATENT DOCUMENTS

| | | | |
|---|---|---|---|
| 5,140,206 A | * | 8/1992 | Hasegawa .............. B60K 31/04 310/100 |
| 5,964,330 A | | 10/1999 | Organek |

(Continued)

FOREIGN PATENT DOCUMENTS

EP    0716242 B1    6/1996

*Primary Examiner* — Terrance Kenerly
*Assistant Examiner* — Alexander Singh
(74) *Attorney, Agent, or Firm* — Cozen O'Connor

(57) ABSTRACT

A drive unit for a motor vehicle includes an electric machine which has a stator, a rotor and clutch for producing a rotary driving connection of the rotor to a drive element. The clutch has a release member which is axially displaceable by an actuating device arranged at least partially in a receiving space surrounded by the stator. The actuating device has an electric actuator drive motor and an actuator drive shaft directed transverse to the axis of rotation of the drive unit. The actuator drive shaft is operatively connected to a release arrangement which includes a rotatable input element which is fixed axially relative to the release member and an output element which is axially displaceable relative to the input element and which is operatively connected to the release member.

14 Claims, 4 Drawing Sheets

(51) Int. Cl.
   *B60K 6/387*   (2007.10)
   *F16D 23/12*   (2006.01)
   *B60K 6/48*   (2007.10)

(56) References Cited

U.S. PATENT DOCUMENTS

| | | | |
|---|---|---|---|
| 5,984,072 A * | 11/1999 | Leimbach | F16D 23/12 192/111.12 |
| 6,771,031 B1 * | 8/2004 | Bai | F16D 48/064 192/3.56 |
| 8,162,115 B2 * | 4/2012 | Seufert | F16D 48/064 192/48.2 |
| 8,267,208 B2 | 9/2012 | Kleuker | |
| 2004/0173428 A1 * | 9/2004 | Bowen | F16D 28/00 192/84.6 |
| 2007/0137911 A1 * | 6/2007 | Gu | B60K 6/387 180/65.31 |
| 2008/0278015 A1 * | 11/2008 | Reisinger | H02K 7/106 310/152 |
| 2009/0066169 A1 * | 3/2009 | Schweiher | F16H 63/304 310/14 |
| 2011/0180363 A1 * | 7/2011 | Westerberg | F16D 23/12 192/84.9 |

* cited by examiner

DRIVE UNIT FOR A MOTOR VEHICLE WITH AN ELECTRIC MACHINE AND A CLUTCH

BACKGROUND OF THE INVENTION

1. Field of the Invention

The invention is directed to a drive unit for a motor vehicle including an electric machine, a clutch and a release member which is axially displaceable by an actuating device arranged at least partially in a space surrounded by the stator of the electric machine.

2. Description of the Related Art

A generic drive unit of the kind mentioned above has been known, for example, from U.S. Pat. No. 8,267,208 and can be used by itself or in combination with an internal combustion engine in the drivetrain of a motor vehicle. The clutch which is constructed to form a constructional unit with an electric machine can couple or uncouple the rotor of the electric machine to or from a further drive element of the vehicle drivetrain, in this case particularly an internal combustion engine, depending on operating state, by an actuating device arranged inside the stator. The actuating device is preferably provided in this case as a hydraulically or pneumatically working central clutch controller.

This constructional unit has been found to be disadvantageous in that the installation expenditure incurred by installing the pressure transmission lines of the clutch actuation device is relatively high and the installation space requirement is correspondingly large. Further, the gear ratios of the actuation device can vary as a result of the required long pressure lines and the temperature dependency of the fluid used and can therefore adversely affect a desired magnitude of the release stroke of the clutch.

EP 0 716 242 B1 discloses an actuating device which does not belong to the generic type mentioned above and which has an electric motor drive for a vehicle friction clutch that can be actuated by a diaphragm spring. The electric motor drive has an electric actuator drive motor with an actuator drive shaft which is directed transverse to a release axis of the clutch and which engages by means of a worm in an externally toothed housing segment of a release bearing of the clutch, this housing segment forming the worm gear. The release bearing housing is rotatably arranged at a stationary holder by means of a quick thread. During rotational movement of the actuator drive shaft, the bearing housing executes a rotational movement which undergoes a simple reduction by the worm-worm gear combination and which is simultaneously converted into an axial movement owing to the quick thread. In this way, a release bearing arranged at the end of the housing is moved toward a clutch release member causing the clutch to be released.

In this actuating device, the quick thread requires a relatively high actuating torque to displace the release bearing housing, for which reason the selected radial distance of the worm drive from the rotational axis or release axis must be relatively large. Further, the actuator drive shaft of the electric machine which is fastened to the outer side of an approximately cylindrical gear unit housing must be dimensioned so as to have sufficiently great bending strength and torsional strength. In other respects, the axial width of the worm gear segment must be selected such that an engagement with the worm is ensured over the entire actuating path during an actuating process. Since, in addition to a rotational movement, the worm gear segment is axially displaced against the action of the diaphragm spring, very high friction forces occur at the worm gear unit which adversely affect the efficiency of the actuating device.

Proceeding from the prior art cited above, it is an object of the invention to improve a generic drive unit particularly with respect to the actuating device of the clutch.

SUMMARY OF THE INVENTION

In a drive unit of the type mentioned above, the present invention provides that the actuating device be formed with an electric actuator drive motor and with an actuator drive shaft which is operatively connected to a release arrangement. The release arrangement converts a rotational movement of the actuator drive shaft into a translational movement acting on the release member of the clutch. The release arrangement comprises a rotatable input element which is axially fastened to the release member and an output element which is axially displaceable relative to the input element and which is operatively connected to the release member.

In this way, the input element of the release arrangement, which input element cooperates with the actuator drive shaft, can execute exclusively a rotational or swiveling movement around a release axis so that the friction forces acting at this position can be reduced and the efficiency of the actuating device can be increased overall. As opposed to an actuating device known from the prior art, costly installation of pressure lines and the required hydraulic or pneumatic couplings can be dispensed with. Electric cables for controlling an actuator drive motor can be installed in a comparatively simple manner.

According to a first advantageous further development, it is suggested that a reduction gear unit is arranged between the actuator drive shaft and the input element of the release arrangement, and this reduction gear unit can be constructed in particular with a first gear stage and a second gear stage. Accordingly, the actuator drive motor can have a comparatively low nominal torque and can be configured instead for a high rotational speed and can therefore be constructed in a very compact manner. A gear ratio i defined by the output speed of the actuator drive motor and the input speed of the release arrangement is preferably greater than 50, particularly preferably greater than 100, particularly greater than 120. Owing to the gear reduction which comprises at least two stages and which is advantageously arranged in the region of the release arrangement, the actuator drive shaft can be constructed so as to be comparatively short. Further, because of the relatively smaller torque to be transmitted by the actuator drive shaft, this actuator drive shaft need only have a relatively small diameter. In other words, the axial installation space required for the actuator drive shaft is comparatively small.

The relationship of an axial actuating path of the output element of the release arrangement to a rotational angle of the actuator drive shaft can be basically linear. Alternatively, however, it can prove particularly advantageous when this relationship is nonlinear. A gear ratio of the actuating device which is accordingly variable over the actuating path of the release device can be advantageous particularly in connection with a variable gear ratio of the release member, for example, a diaphragm spring. This may be the case when the actuating path impressed on the input region of the diaphragm spring by the release device has a nonlinear relationship to an axial stroke generated at the output region of the diaphragm spring. However, in other respects, even in case of a linear transmission characteristic of the release member, a nonlinear gear ratio characteristic such as that described above can also be advantageous for a partial increase in the releasing force acting on the release member.

According to an embodiment of the invention, it is advantageous to construct the release arrangement as a ball ramp drive as, for example, known from U.S. Pat. No. 5,964,330 which is incorporated herein by reference in its entirety. In this case, the input element and output element are preferably constructed with corresponding ball ramps or ball races and balls running therebetween and are arranged axially relative to one another. Particularly preferably, the ball races or ball ramps are arranged on the front side at the input element and output element, which results in only a small, space-saving radial dimension of the release arrangement.

A first gear stage of the reduction gear unit advantageously comprises a worm gear unit, and the actuator drive shaft carries a worm or can be coupled with a worm cooperating with a worm gear. This worm gear can be constructed separately or so as to form a constructional unit with a spur gear which serves as a component part of a second gear stage of the reduction gear unit and which engages with a further spur gear for transmission and reduction of a rotational movement of the actuator drive, this further spur gear preferably being constructed with the input element of the release arrangement or arranged thereon.

In a particularly advantageous manner, the actuating device is constructed so as to be self-locking so that the release member of the connected clutch remains in the axial setting that was moved into last, even when there is no power being supplied to the actuator drive motor. The self-locking can be realized in a particularly preferable manner, but not exclusively, by means of a worm gear unit, i.e., between a worm and a worm gear. Alternatively, the actuating device can also be constructed so as to reset automatically, which is particularly advantageous for safety reasons.

A particularly compact mode of construction of the drive unit can be achieved in that the actuator drive shaft is directed transverse to the axis of rotation A of the drive unit and extends axially adjacent to the stator, and in that the actuator drive motor is arranged radially outwardly of the electric machine serving as drive unit. In so doing, the actuator drive motor and the drive unit can overlap axially so as to economize on installation space. The actuator drive motor can preferably be fastened to a housing enclosing the drive unit, where it is particularly easy to access for maintenance purposes or replacement.

In particular, the actuating device can be fastened at least indirectly to the stator of the electric machine by the actuator drive shaft, possibly with the reduction gear unit and with the release arrangement, and can be supported against an active clutch actuating force. A stator carrier or another element fixedly connected to the stator, e.g., a housing wall or the like connected to the stator, is advantageously suited to this purpose.

According to a further embodiment of the invention, the release arrangement has a device for compensating lining wear at the friction plate, which device keeps the diaphragm spring in constant contact with the release bearing regardless of the degree of wear at the friction plate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

The invention is described by way of example in the following with reference to the accompanying drawings in which.

DETAILED DESCRIPTION OF THE PRESENTLY PREFERRED EMBODIMENTS

Figure 1:
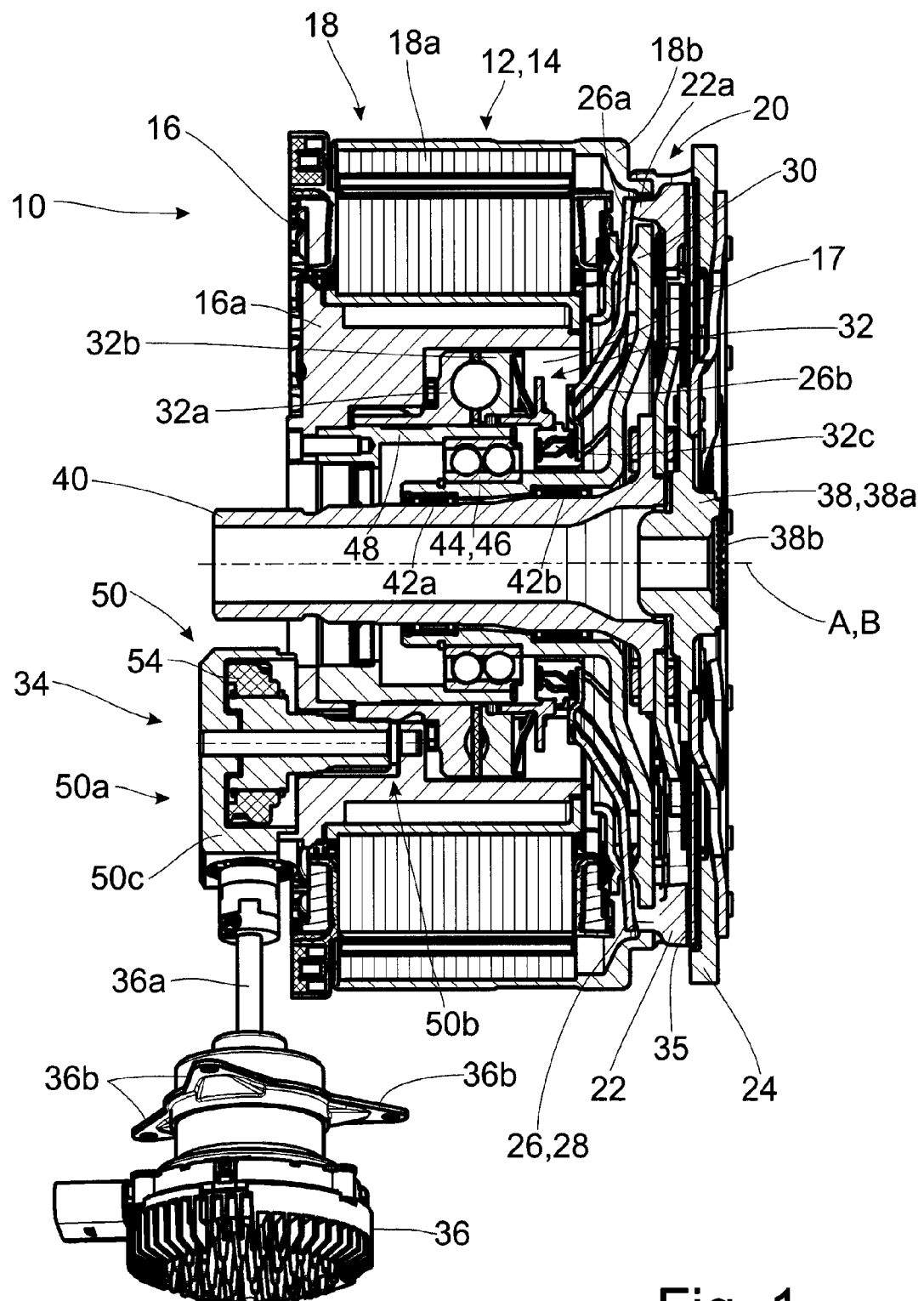
FIG. 1 an axial sectional view through a drive unit with electric machine, a friction clutch and an actuating device for actuating the clutch.

The drive unit 10, shown in the drawings, for a hybrid vehicle comprises a drive unit 14 which is constructed as an electric machine 12 and which has a stator 16 and a rotor 18 which is mounted coaxial thereto so as to be rotatable around an axis of rotation A. The electric machine 12 is constructed in the present instance as an external rotor machine but can also be constructed as an internal rotor machine in principle depending on the available installation space.

The drive unit 10 further comprises a clutch 20 which is constructed in this instance so as to form a constructional unit with the electric machine 12, particularly a shiftable friction clutch for producing a rotary driving connection of the rotor 18 to at least one further drive element of the vehicle drivetrain. The rotor 18 comprises a magnetically active portion 18a with stacked laminations and permanent magnets arranged at the latter and further comprises a rotor carrier 18b which is cup-shaped in this instance.

As further development of the clutch 20, the rotor carrier 18b carries an annular pressure plate assembly 22 which is rotatable with the rotor carrier 18b and which is displaceable in direction of a pressure plate 24 which is connected to the rotor 18 so as to be fixed with respect to rotation relative to it. The pressure plate assembly 22 additionally has a plurality of axial extensions 22a which are distributed along the circumference and extend through axial openings of the rotor carrier 18b. A release member 28 formed as a diaphragm spring 26 serves to transmit an actuating force to the pressure plate assembly 22. The diaphragm spring 26 is swivelably supported at an axial cutting extension 30 of the rotor carrier 18b and contacts the extensions 22a by a radially outer annular portion 26a and contacts a release arrangement 32 by radially inwardly extending spring tabs 26b.

The release arrangement 32 is a component part of an actuating device 34 for actuating the friction clutch 20 by which the inner portions of the diaphragm spring tabs 26b are axially displaceable and by which the diaphragm spring 26 can axially load the pressure plate assembly 22 by means of the lever arrangement described above.

There is provided axially between the pressure plate assembly 22 and the apply plate 24 a friction plate 35 which is likewise axially displaceable and which, when the clutch 20 is closed, can receive a torque of the electric machine 12 and/or a torque that can be transmitted to the rotor 18. For the latter purpose, the pressure plate 24 which is connected to the rotor 18 or constructed therewith has a rotary driving arrangement 38. In the present instance, this rotary driving arrangement 38 is a hub 38a which is connected to the pressure plate 24 and carries a positive engagement profile 38b in the form of teeth, particularly a spline connection. In this way, the hub 38 can be operatively connected in a simple manner to further elements of the vehicle drivetrain, for example, a downstream gearbox.

The friction plate or clutch plate 35 is in rotary driving connection with a driveshaft 40 which is guided centrally through the inside of the electric machine 12 and which can transmit a torque, for example, to a crankshaft of an internal combustion engine of the motor vehicle. Of course, when torque flows in the opposite direction and the clutch 20 is closed, a torque delivered by an internal combustion engine can act on the rotor 18 via the driveshaft 40 and friction plate 35 and can simultaneously be delivered to further elements (not shown) of the drivetrain via the connection arrangement.

As can be seen in FIG. 1, the driveshaft 40 is radially and axially bearing-supported in the interior of the cup-shaped rotor carrier 18b by means of two rolling bearing arrangements 42a; 42b which are spaced apart from one another axially.

The rotor 18 is in turn mounted so as to be rotatable concentric to the stator 16 by a bearing arrangement 44 which is fixed to a stator carrier 16a and is likewise axially fixed to the stator 16. In this embodiment, the bearing arrangement 44 is constructed as a rolling bearing 46, particularly as a double-row ball bearing which is received within a sleeve-shaped bearing carrier 48 extending axially and centrally within the stator 16 at the stator carrier 16a.

Radially between the stator carrier 16a and the bearing carrier 48, there is formed an annular receiving space 17 which, as will be described in more detail in the following, receives at least part of the actuating device 34 for actuating the friction clutch 20.

Figure 2:
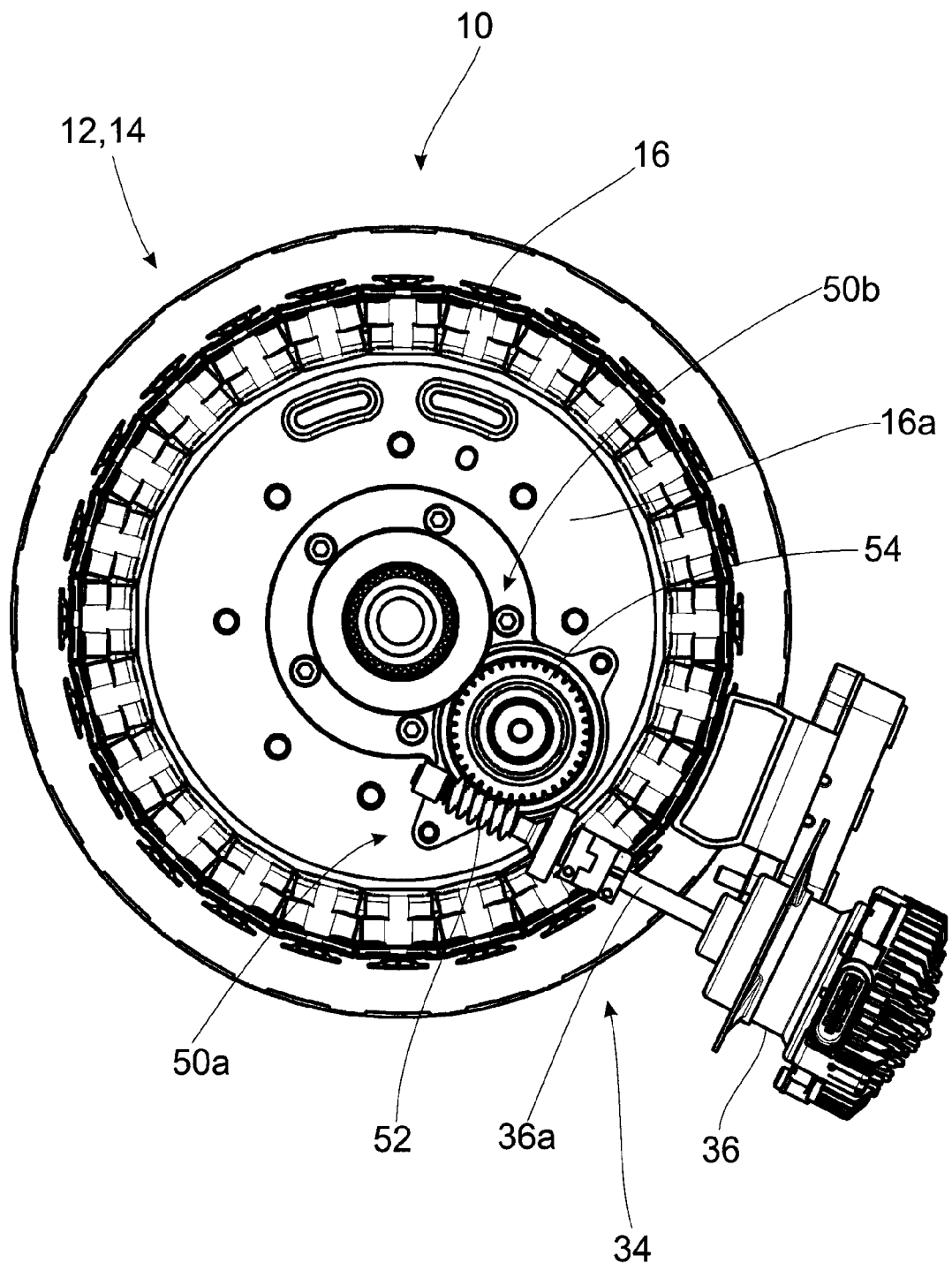
FIG. 2 a front view of the drive unit of FIG. 1 viewed toward an actuator drive motor and a first gear reduction.

As shown in FIG. 2 the actuating device 34 comprises an electric actuator drive motor 36 with an actuator drive shaft 36a directed transverse to the axis of rotation A of the drive unit 12, 14 and the above-mentioned release arrangement 32. The actuator drive motor 36 is arranged radially outwardly of the electric machine 12. The actuator drive shaft 36a extends axially adjacent to the stator 16 and transverse, particularly substantially perpendicular, to the axis of rotation A of the electric machine which coincides here with a release axis B of the release arrangement 32.

The drive unit 10 shown in the drawing is provided for arranging in a housing, not shown, for example, in a gear unit housing or separate therefrom in an intermediate housing of the vehicle drivetrain. The actuator drive motor 36 can be fixed to the outer side of the housing by means of a plurality of fastening lugs 36b.

The release arrangement 32 is operatively connected to the actuator drive shaft 36a and is designed to convert a rotational movement of the actuator drive shaft 36a into a translational movement acting on the release member 28 of the clutch 20.

Figure 3:
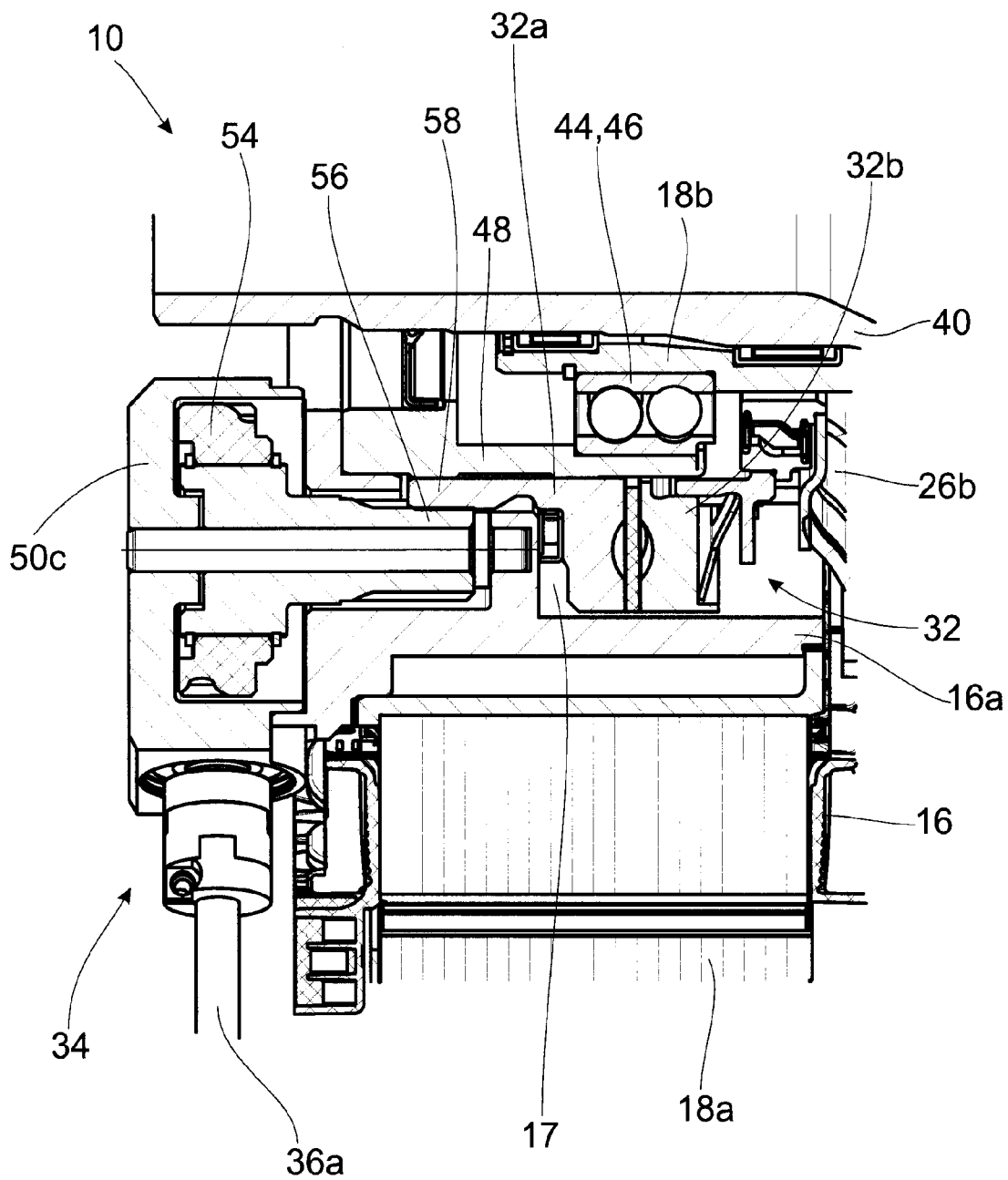
FIG. 3 an enlarged sectional view from FIG. 1 with the release arrangement of the clutch.

To this end, the release arrangement 32 comprises a rotatable input element 32a which is fixed axially relative to the release member 28 and an output element 32b which is axially displaceable relative to the input element 32a and which operatively engages to the release member 28, i.e., the diaphragm spring 26, for rotational decoupling via a release bearing 36c. In the embodiment example, the release arrangement 32 is constructed as a ball ramp drive, wherein balls guided in ramps run between the input element 32a and the output element 32b (FIG. 3).

Figure 4A:
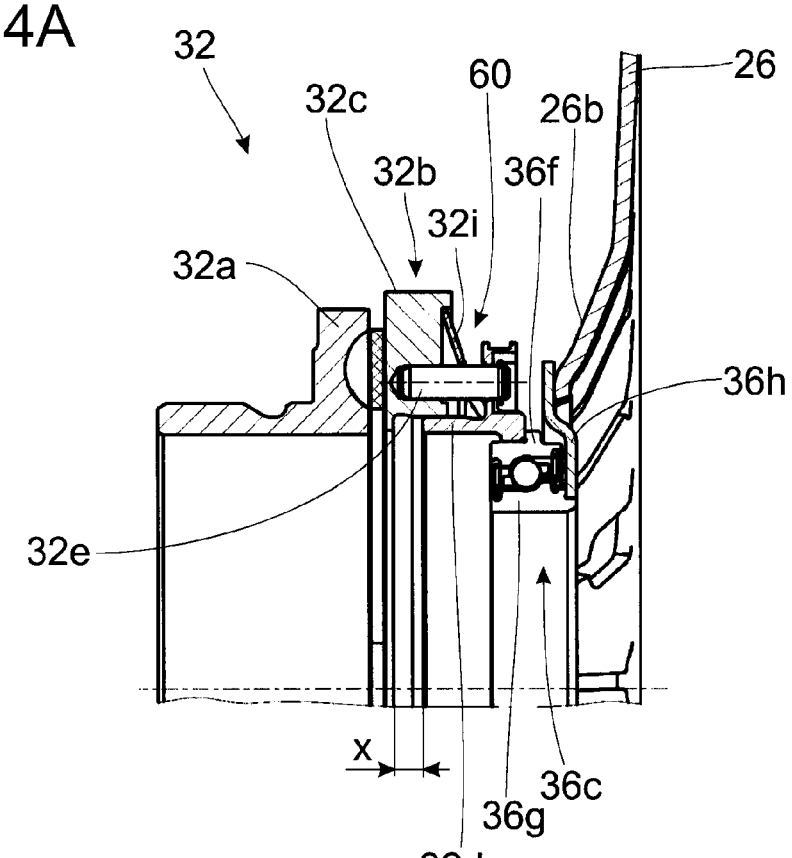
FIG. 4A a view of the release arrangement with a device for compensating lining wear of the clutch friction plate in new condition of the clutch friction plate.
Figure 4B:
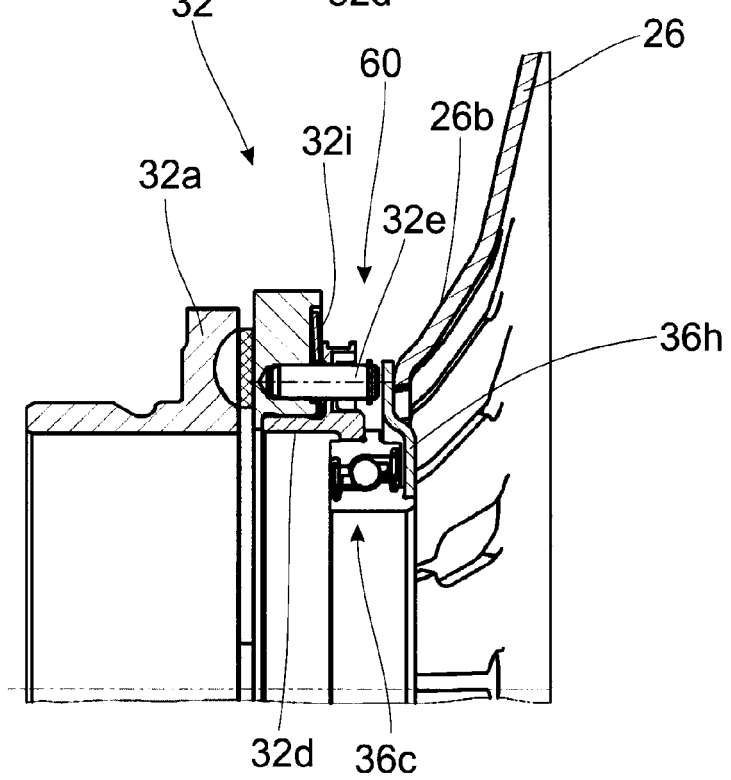
FIG. 4B a view according to FIG. 4A in worn condition at the end of life of the clutch friction plate.

As shown in FIGS. 4A and 4B the release arrangement 32 further has a device 60 for compensating lining wear at the friction plate 35, which device 60 keeps the diaphragm spring 26 in constant contact at the release bearing 36c regardless of the degree of wear at the friction plate 35. To this end, the output element 32b comprises a bearing carrier 32d which is axially displaceable relative to a base body 32c by means of guide pins 32e and which receives the release bearing 36c by one of its bearing rings 36f, in this case the outer bearing ring 36f. The other bearing ring 36g which revolves with the clutch 20 contacts the free ends of the spring tabs 26b via a contact disk 36h. The axial movement of the bearing carrier 32d is limited on one side in direction of the clutch 20 by a stop at the guide pins 32e and on the other side in the opposite direction by a stop at the base body 32c. Clamped axially between the bearing carrier 32d and the base body 32c is a flexible element 32i, in this case a disk spring, which loads the bearing carrier 32d in direction of the diaphragm spring 26 and brings the release bearing 36c into contact with the diaphragm spring tabs 26b by means of the contact disk 36h. Accordingly, in the unworn, new condition of the friction plate 35 the bearing carrier 32d is displaced with respect to the base body 32c of the output element 32b by an amount which is preferably at least equal to or greater than a release wear path x which will be described below.

As wear increases on the friction plate 35, the free ends of the spring tabs 26b in the closed state of the clutch 20 displace axially in direction of the release arrangement 32 and the amount of this displacement from the new condition to the end of life of the friction plate 35 represents the release wear path x. As wear increases, the release bearing 36c is displaced in direction of the base body 32c, referring to the closed, i.e., not actuated, state of the clutch 20, by overcoming the spring force of the flexible element 32i until the release wear path x is used up and the bearing carrier 32d of the release bearing 36c comes into contact with the base body 32c (FIG. 4B).

With respect to the transmission of an actuating force, the flexible element 32i and the diaphragm spring 26 are connected in series so that when the clutch 20 is actuated the rest of the wear path remaining from the actual wear condition is first overcome or used up accompanied by tensioning of the flexible element 32i, and only thereafter is the diaphragm spring 26 swiveled.

As shown in FIGS. 1 and 2 to generate a rotational speed reduction or a torque multiplication, a reduction gear unit 50 with at least a first gear stage 50a and a second gear stage 50b is arranged between the actuator drive shaft 36a and the release arrangement 32. The first gear stage 50a of the reduction gear unit 50 is realized by a worm gear unit, for which purpose the actuator drive shaft 36a itself or, in this case, a driveshaft portion that is connected or connectable therewith comprises a worm 52 which cooperates with a worm gear 54. The worm gear 54 is bearing-mounted in a twofold manner and, in this respect, is rotatably arranged at the stator carrier 16a and at a gear unit housing 50c.

The second gear stage 50b comprises a spur gear unit formed of a pair of spur gears 56; 58 (FIG. 3). A first spur gear 56 is arranged jointly with the worm gear 54 to form a constructional unit. The second spur gear 58 is formed at the input element 32a of the release arrangement 32 and is positioned so as to be rotatable with the latter on the bearing carrier 48. The reduction gear unit 50 and the release arrangement 32 are accordingly arranged so as to be supported at the stator carrier 16a. The first gear stage 50a is located directly axially adjacent to the electric machine 12, while the second gear stage 50*b* and the release arrangement 32 are arranged inside the receiving space 17.

Due to the interaction of the two gear stages 50*a, b* with an additional multiplication of the release arrangement 32 itself, i.e., when the rotational movement is transformed into the translational movement, an overall nonlinear characteristic of the actuating device 34 can be produced, and an axial actuating path of the output element 32*b* of the release arrangement 32 has a nonlinear relationship to a rotational angle of the actuator drive shaft 36*a*. The nonlinear contribution is produced particularly by a corresponding configuration of the release arrangement 32, in this case the ball ramp drive. Alternatively, an overall linear characteristic of the actuating device 34 can also be produced.

Further, the extent of friction forces acting between the elements of the actuating device 34 can be selected in such a way that an automatic resetting is omitted when the actuating device 34 is activated, in the case of the embodiment example when the clutch 20 is disengaged, i.e., the actuating device 34 is constructed so as to be self-locking.

Alternatively, however, it may also be advantageous, for example, for reasons of safety, to minimize the friction of the actuating device 34 in order to achieve an automatic resetting. In this case, the required resetting force is provided by the energy that is stored in the release member 28 itself or in separate resetting springs during an actuation process. To this end, for example, a suitably chosen design of the worm set, i.e., the worm 52 and worm gear 54, can be implemented. When the actuator drive motor 36 is not powered, the clutch 20 reverts to its normal condition which, in the present instance, is a normally-closed state.

Alternatively, the actuator drive motor can also be arranged within the radial extension of the electric machine, where this actuator drive motor is protected from external influences and where only the electric supply lines need extend.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A drive unit for a motor vehicle, comprising:
    an electric machine (12) including a stator (16) and a rotor (18) mounted coaxially to the stator and rotatable around an axis of rotation (A)
    a receiving space (17) defined concentrically interior of the rotor (18) and/or the stator (16);
    a shiftable clutch (20) for producing a rotary driving connection of the rotor (18) to a drive element (40);
    an actuating device (34) arranged at least in part in the receiving space radially surrounded by the stator (16);
    the shiftable clutch (20) comprising a release member (28) axially displaceable by the actuating device (34);
    the actuating device comprising an electric actuator drive motor (36) having an actuator drive shaft (36*a*), and a release arrangement (32) operatively connected to the actuator drive shaft (36*a*) for converting a rotational movement of the actuator drive shaft (36*a*) into a translational movement acting on the release member (28) of the clutch (20);
    and wherein the release arrangement (32) comprises a rotatable input element (32*a*) fixed axially relative the release member (28) and an output element (32*b*) which is axially displaceable relative to the input element (32*a*) and operatively engages the release member (28).

2. The drive unit according to claim 1, additionally comprising a reduction gear unit (50) arranged between the actuator drive shaft (36*a*) and the release arrangement (32).

3. The drive unit according to claim 2, wherein the reduction gear unit (50) comprises a first gear stage (50*a*) and a second gear stage (50*b*).

4. The drive unit according to claim 2, wherein the first gear stage (50*a*) of the reduction gear unit (50) comprises a worm gear unit.

5. The drive unit according to claim 2, wherein the second gear stage (50*b*) of the reduction gear unit (50) comprises a spur gear unit.

6. The drive unit according to claim 1, wherein an axial actuating path of the output element (32*b*) of the release arrangement (32) is in a nonlinear relationship to a rotational angle of the actuator drive shaft (36*a*).

7. The drive unit according to claim 1, wherein the release arrangement (32) is constructed as a ball ramp drive (32*a*, 32*b*).

8. The drive unit according to claim 1, wherein the actuating device (34) is constructed so as to be self-locking.

9. The drive unit according to claim 1, wherein the actuating device (34) is constructed so as to reset automatically.

10. The drive unit according to claim 1, wherein the actuator drive shaft (36*a*) is directed transverse to the axis of rotation A of the drive unit (14) and extends axially adjacent to the stator (16), and wherein the actuator drive motor (36) is arranged radially outwardly of the electric machine (12).

11. The drive unit according to claim 1, wherein the actuating device (34) is fastened at least indirectly to the stator (16) of the electric machine.

12. The drive unit according to claim 1, additionally comprising a friction plate (35) having a lining subject to wear and wherein the release arrangement (32) comprises a device (60) for compensating lining wear at the friction plate (35).

13. The drive unit according to claim 1, wherein the release arrangement is disposed in its entirety within the receiving space (17).

14. The drive unit according to claim 1, wherein the release arrangement (32) comprises an axis of rotation (B); wherein the axis of rotation (A) of the electric machine coincides with the axis of rotation (B) of the release arrangement; and wherein the rotatable input element (32*a*) of the release arrangement is constructed to execute a rotational movement around the axis of rotation (B) of the release arrangement.

* * * * *